US007031382B2

United States Patent
Hessel et al.

(10) Patent No.: US 7,031,382 B2
(45) Date of Patent: Apr. 18, 2006

(54) NON-LINEAR EQUALIZER SYSTEM AND METHOD

(75) Inventors: Clifford Hessel, Rochester, NY (US); James A. Norris, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 774 days.

(21) Appl. No.: 09/983,110

(22) Filed: Oct. 23, 2001

(65) Prior Publication Data

US 2002/0054633 A1    May 9, 2002

Related U.S. Application Data

(60) Provisional application No. 60/242,752, filed on Oct. 24, 2000.

(51) Int. Cl.
*H03H 7/40* (2006.01)
*H03D 3/22* (2006.01)

(52) U.S. Cl. ...................... 375/229; 375/329

(58) Field of Classification Search ............... 375/229, 375/230, 348, 346, 316, 332, 329; 708/322, 708/323
See application file for complete search history.

(56) References Cited

U.S. PATENT DOCUMENTS 6,310,926 B1 * 10/2001 Tore ......................... 375/355
6,584,305 B1 * 6/2003 Ohta et al. ................. 455/307

* cited by examiner

*Primary Examiner*—Khai Tran
(74) *Attorney, Agent, or Firm*—Duane Morris LLP

(57) ABSTRACT

A system and method for compensating for angular distortion of a received waveform is disclosed. One embodiment measures the angular position of a current symbol, the preceding symbol and the succeeding symbol, calculates the phase shift between the current symbol and a preceding symbol and the phase shift between the current symbol and a succeeding symbol, uses the phase shifts to enter a 2-D lookup table to extract a phase correction factor, then uses the phase correction factor to modify the angular position of the current symbol.

56 Claims, 9 Drawing Sheets

$$\delta_{fwd} = \frac{(\theta_{\exp} - \theta_i)}{(\theta_i - \theta_{i+1})} \qquad \delta_{rev} = \frac{(\theta_{\exp} - \theta_i)}{(\theta_i - \theta_{i-1})} \qquad 610$$

$$\alpha_{fwd} = \frac{1}{N}\sum_N \delta_{fwd} \qquad \alpha_{rev} = \frac{1}{N}\sum_N \delta_{rev} \qquad 620$$

$$\phi_{fwd} = (\theta_i - \theta_{i+1}) \cdot \alpha_{fwd} \qquad \phi_{rev} = (\theta_i - \theta_{i-1}) \cdot \alpha_{rev} \qquad 630$$

$$e^{j\theta_i} e^{j\phi_{rev}} e^{j\phi_{fwd}} \qquad 640$$

where: $\theta_i$ = actual angular position of the current symbol $\theta_{\exp}$ = expected angular position of the current symbol $\theta_{i-1}$ = angular position of the preceding symbol $\theta_{i+1}$ = angular position of the succeeding symbol $\phi_{rev}$ = reverse phase correction factor $\phi_{fwd}$ = forward phase correction factor

*FIGURE 6*

2-D LUT

| | | | | | | | |
|---|---|---|---|---|---|---|---|
| $+\Delta\theta_{REV_M}$ | $\phi_{-N,M}$ | $\cdots$ | $\phi_{-1,M}$ | $\phi_{0,M}$ | $\phi_{1,M}$ | $\cdots$ | $\phi_{N,M}$ |
| $\vdots$ | $\vdots$ | | $\vdots$ | $\vdots$ | $\vdots$ | | $\vdots$ |
| $+\Delta\theta_{REV_1}$ | $\phi_{-N,1}$ | $\cdots$ | $\phi_{-1,1}$ | $\phi_{0,1}$ | $\phi_{1,1}$ | $\cdots$ | $\phi_{N,1}$ |
| $0$ | $\phi_{-N,0}$ | $\cdots$ | $\phi_{-1,0}$ | $0$ | $\phi_{1,0}$ | $\cdots$ | $\phi_{N,0}$ |
| $-\Delta\theta_{REV_1}$ | $\phi_{-N,-1}$ | $\cdots$ | $\phi_{-1,-1}$ | $\phi_{0,-1}$ | $\phi_{1,-1}$ | $\cdots$ | $\phi_{N,-1}$ |
| $\vdots$ | $\vdots$ | | $\vdots$ | $\vdots$ | $\vdots$ | | $\vdots$ |
| $-\Delta\theta_{REV_M}$ | $\phi_{-N,-M}$ | $\cdots$ | $\phi_{-1,-M}$ | $\phi_{0,-M}$ | $\phi_{1,-M}$ | $\cdots$ | $\phi_{N,-M}$ |
| | $-\Delta\theta_{FWD_N}$ | $\cdots$ | $-\Delta\theta_{FWD_1}$ | $0$ | $+\Delta\theta_{FWD_1}$ | $\cdots$ | $+\Delta\theta_{FWD_N}$ |

NON-LINEAR EQUALIZER SYSTEM AND METHOD

This application claims the benefit of Provisional Application No. 60/242,752, filed Oct. 24, 2000.

BACKGROUND OF THE INVENTION

The present invention relates to compensating for distortion of a received waveform. The distortion may be manifest in intersymbol interference and the concomitant increase in bit error rate ("BER") thereby reducing the performance of the communication system. More specifically, the invention relates to a novel system and method of compensating for phase distortion of a received waveform containing digital symbols at one of a predetermined number of phase angles. One of the received waveforms the present invention is directed towards is a continuous phase modulation ("CPM") waveform received from a satellite transponder.

Satellite transponders typically are comprised of a series of filters and hard-limiting amplifiers which modify the phase angle and amplitude of each symbol of the CPM phase constellation. Continuous phase modulation ("CPM") waveforms undergo appreciable distortion due to the effects of the bandlimiting and hard-limiting satellite transponder. A typical CPM waveform used for satellite communications is the MIL-STD-181B ("181B") waveform. Other well-known waveforms and some proprietary waveforms also use CPM and are contemplated with the use of the present invention. The 181B CPM constellation contains four possible frequencies per symbol which are multiples of alternating frequency deviations. Other waveforms may use 4-, 8-, and 16-ary constellations which take advantage of channel conditions to get the highest possible data throughput. Regardless of the constellation used, CPM symbols transition in phase per unit time (frequency). At a receiver the frequency errors appear, at that instant, to change the phase constellation. The distortion on each phase is induced by a number of elements, the largest of which is the satellite transponder. This distortion has its largest effect on the 16-ary CPM waveform and may prevent a receiver from synchronizing with a transponder on the satellite. The distortion also increases the BER of data being transmitted by the waveform. The BER may be used as a metric to indicate the performance of a transmission system. The lower the BER, the higher the performance and data throughput since less time must be spent retransmitting data.

A typical prior art solution to the distortion problem is to develop an inverse filter which predistorts the waveform prior to transmission. This solution requires modification to the transmitter itself. This type of solution may be useful for transmitters now being deployed as well as for transmitters that are easily accessed and modified but is highly impractical for existing satellite transponders. Another typical prior art solution uses an inverse filter to remove the distortion from the received waveform at the receiver. In this case, a post-distortion Least Mean Square Decision Feedback Equalizer ("LMSDFE") method is typically chosen. In this application, the traditional LMSDFE equalizer can remove some of the intersymbol interference at low symbol rates, but at higher symbol rates the modem performance is far off from the same bit error rate achieved in an environment which only contains additive white gaussian noise ("AWGN").

Observation of satellite communication channels with bandlimiting filters and hard-limiting amplifiers has shown that waveforms, notably the CPM waveform, is predictably distorted in phase during symbol transitions. Large phase transitions incur a larger, proportional amount of distortion when compared to smaller phase transitions. Additionally, the amount of distortion is independent of the angular location of any particular symbol. A characterization of phase error as a function of all the possible clockwise and counterclockwise adjacent phase transitions for the CPM phase constellation illuminates this proportional property of the distortion caused by the intersymbol interference. Once this error is characterized for all the symbols, the error can be removed by modifying the received phase angle for a symbol. One way to modify the received phase angle of a symbol is by subtracting the error value from the received angle. Another way to modify the received phase angle of a symbol is to multiply, via complex multiplication, the received phase angle by a derived error factor that is a function of either the reverse or forward phase shift or is a function of both the reverse and forward phase shifts.

The present invention avoids the problems of the prior art by exploiting the predictable phase distortion during symbol transitions discussed above. One embodiment of the present invention compensates for distortion of a received waveform by measuring the reverse and forward phase shifts for a given symbol then modifies the phase angle for the given symbol as a function of both the reverse and forward phase shifts to thereby compensate for phase distortion of the received waveform. This method has been shown to outperform the traditional LMSDFE equalizer especially when considering the noise enhancement inherent in LMSDFE equalizers.

Accordingly, it is an object of the present invention to obviate many of the above problems in the prior art and to provide a novel system and method of compensating for distortion of a received waveform containing digital symbols at one of a predetermined number of phase angles.

It is another object of the present invention to provide a novel system and method for modifying the phase angle of a received symbol as a function of at least the reverse phase shift.

It is yet another object of the present invention to provide a novel system and method for modifying the phase angle of a received symbol as a function of at least the forward phase shift.

It is still another object of the present invention to provide a novel system and method for modifying the phase angle of a received symbol of a continuous phase modulation waveform as a function of the reverse and forward phase shifts for the received symbol.

It is a further object of the present invention to provide a novel system and method for compensating for angular distortion of a received symbol by use of at least one lookup table.

It is yet a further object of the present invention to provide a novel system and method of equalizing a received waveform containing digital symbols at one of a predetermined number of phase angles to reduce the angular distortion of the received symbols.

It is still a further object of the present invention to provide a novel system and method of reducing the intersymbol interference in the form of phase error of a received waveform containing digital symbols at one of a predetermined number of phase angles.

It is an additional object of the present invention to provide a novel system and method of reducing the intersymbol interference in the form of phase error of a received continuous phase modulation waveform containing digital symbols by modifying the phase angle of a received symbol as a function of a predetermined number of reverse and forward phase differences.

It is yet an additional object of the present invention to provide a novel angular distortion compensator.

It is still an additional object of the present invention to provide a novel method of compensating for distortion of a received 16-ary waveform in a satellite communication channel.

It is a further additional object of the present invention to provide a novel non-linear equalizer for a continuous phase modulation waveform.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 6 is a set of equations used to determine phase error of a received current symbol according to one embodiment of the present invention.

FIG. 8 is a notional view of a two-dimensional lookup table used by one embodiment of the present invention.

DESCRIPTION OF PREFERRED EMBODIMENTS

With reference to the drawings, like numerals represent like components and like relationships throughout the several drawings.

Figure 1:
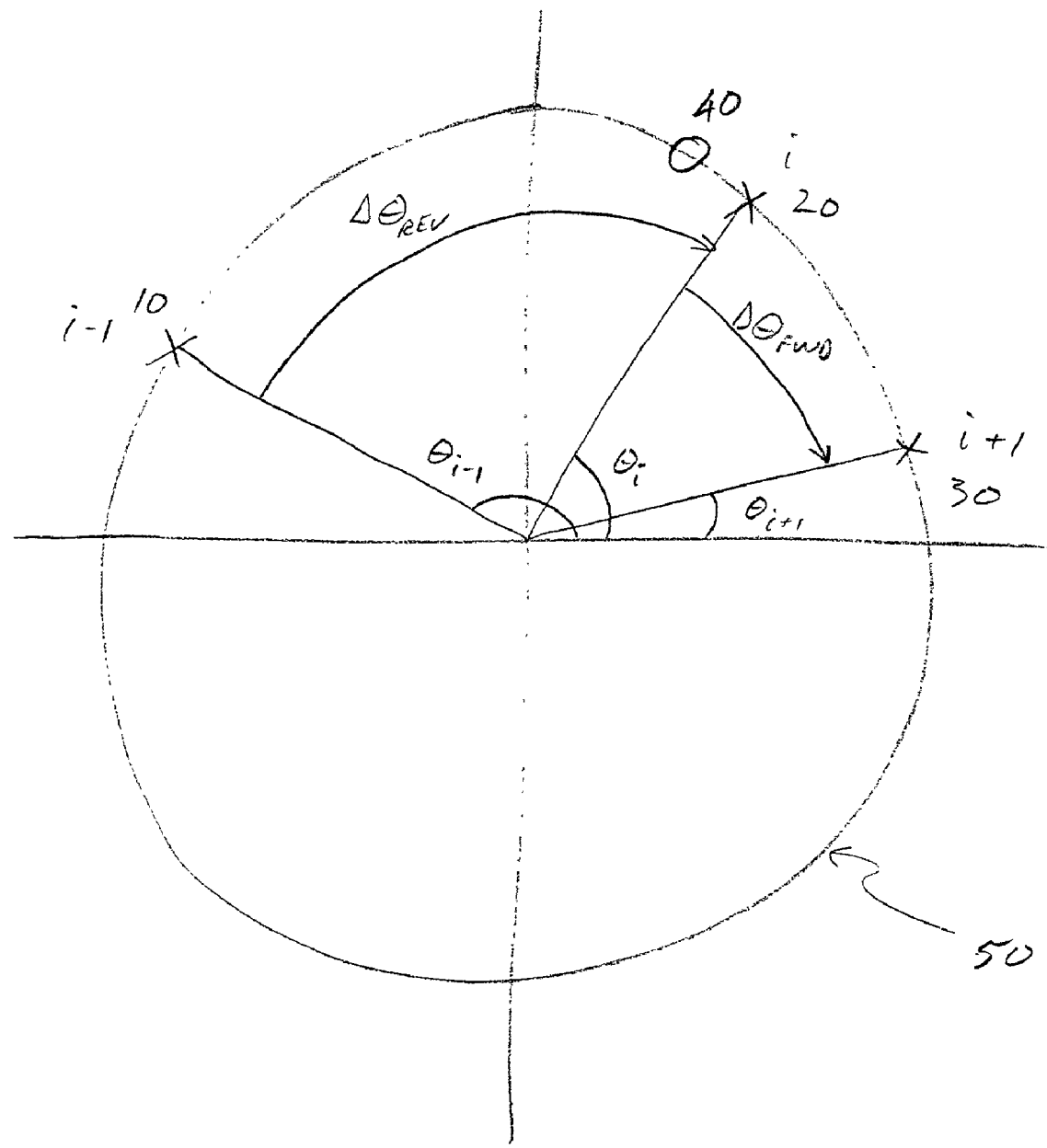
FIG. 1 is a diagrammatic view of a waveform constellation, such as a CPM constellation, showing the angular orientation of three notional successive received symbols and the associated angles and phase differences with clockwise rotation between the preceding symbol and the current symbol and clockwise rotation between the current symbol and the succeeding symbol. Also shown is the expected angular position of the current symbol.

FIG. 1 is a diagrammatic view of a waveform constellation, such as a CPM constellation, showing the angular orientation of three notional successive symbols and the associated angles and phase differences. While a CPM waveform is discussed below, it is to be understood that the current invention may be used with other waveforms that exhibit phase distortion. The circle 50 is the locus of symbols for the given waveform constellation. The constellation may be a 4-ary, 8-ary, 16-ary, or other waveform. Points 10, 20, and 30 on the circle 50 represent a received preceding symbol, a received current symbol, and a received succeeding symbol, respectively. These points are also denoted throughout the specification and drawings with the subscripts (i−1), (i), and (i+1), respectively. The angular position of the symbols 10, 20, and 30 are denoted as $\theta_{i-1}$, $\theta_i$, and $\theta_{i+1}$, respectively, and may be taken from an arbitrary reference position. As stated above, the phase distortion is independent of the angular location of any particular symbol. Clockwise rotation between the preceding symbol and the current symbol and clockwise rotation between the current symbol and the succeeding symbol is depicted in FIG. 1. Also depicted on the circle 50 is the expected angular position 40 of the current symbol 20. Due to distortion, the received position of the current symbol 20 is offset from the expected position 40. This angular error, or phase error, is a function of the magnitude of the phase shift (i.e., the difference in the angular position) from the preceding symbol to the current symbol and the magnitude of the phase shift from the current symbol to the succeeding symbol. As used herein, the magnitude of the phase shift from the preceding symbol to the current symbol is denoted the "reverse phase shift" ($\Delta\phi_{rev}$) while the magnitude of the phase shift from the current symbol to the succeeding symbol is denoted the "forward phase shift" ($\Delta\phi_{fwd}$). The specific definition of the reverse and forward phase shifts as defined above are not limiting and may be defined in the opposite manner. The current invention provides for a system and method to reduce the phase error of the received current symbol.

Figure 2:
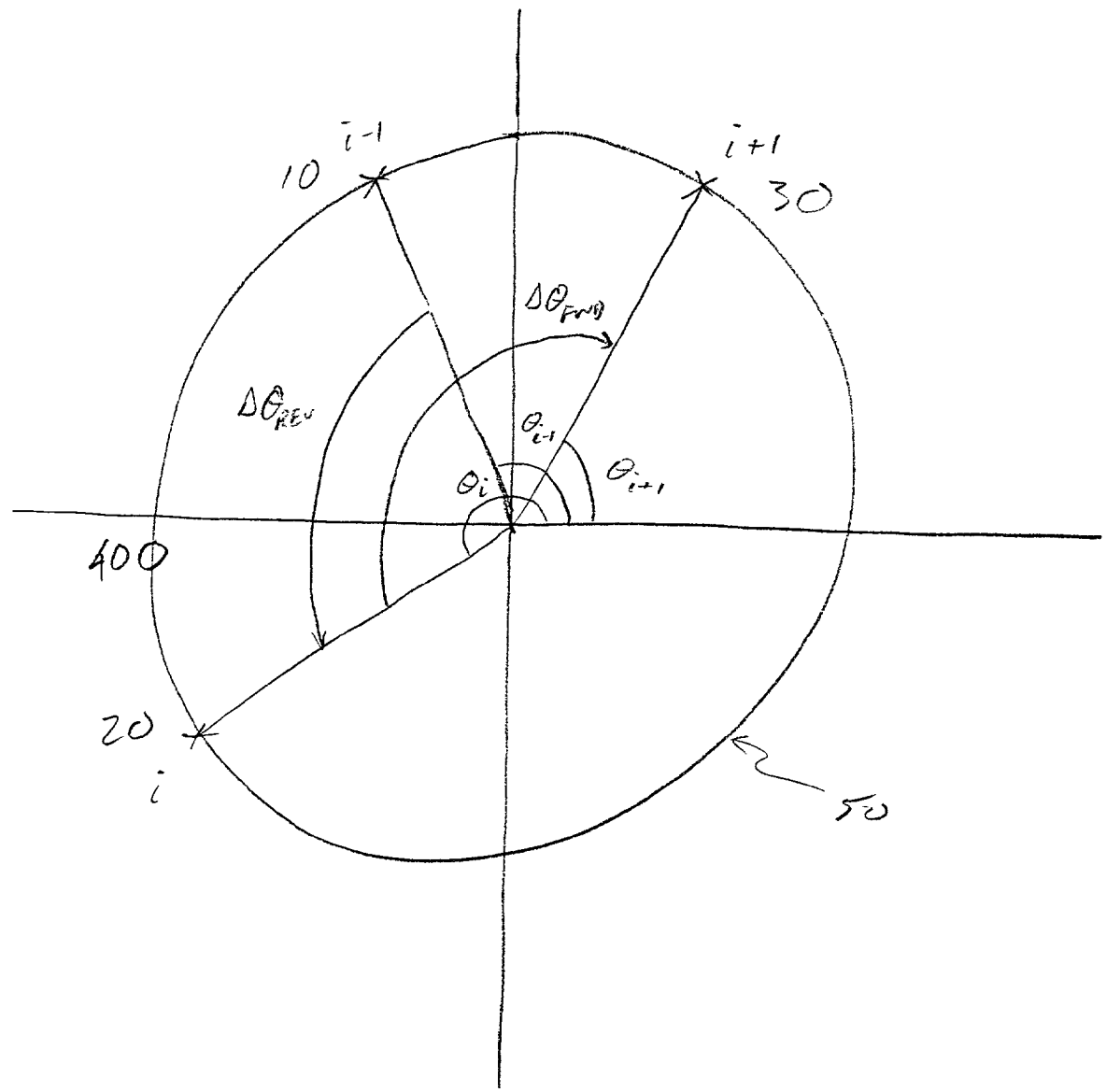
FIG. 2 is another diagrammatic view of a waveform constellation showing the angular orientation of three other notional successive received symbols, the associated angles and phase differences, and the expected angular position of the current symbol. In this Figure, there is counterclockwise rotation between the preceding symbol and the current symbol and clockwise rotation between the current symbol and the succeeding symbol.

With reference now to FIG. 2, another constellation is depicted where like numerals depict like items with FIG. 1. FIG. 2 illustrates a counterclockwise rotation from the angular position of the received preceding symbol 10 to the angular position of the received current symbol 20; and a clockwise rotation between the angular position of the received current symbol 20 and the angular position of the received succeeding symbol 30. Also depicted is the expected angular position 40 of the current symbol. As stated above, the phase error is affected by the reverse and forward phase shifts. Additionally, the magnitude of the phase error is proportional to the magnitude of the phase shifts. Larger reverse and/or forward phase shifts result in a larger phase error. Furthermore, the phase error is independent of any specific constellation position. A characteristics of the phase error when the reverse and forward phase shifts occur in opposite directions is that the angular position of the received current symbol 20 for such a set of phase rotations is closer to the preceding and succeeding symbols than the expected angular position 40 of the current symbol.

Figure 3:
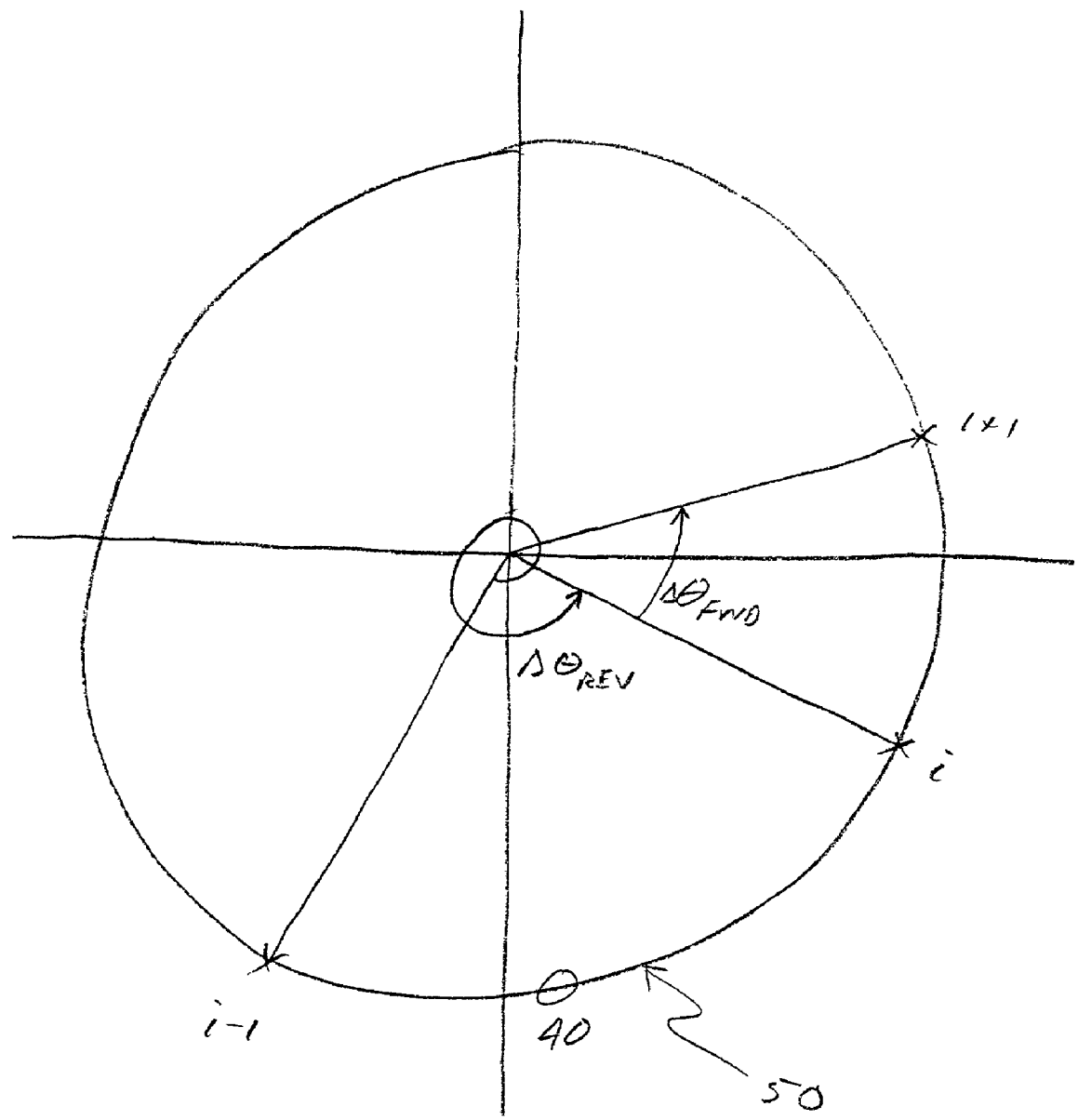
FIG. 3 is yet a third diagrammatic view of a waveform constellation showing three different successive symbols and the associated phase differences. In this Figure, there is counterclockwise rotation of more than 360 degrees between the preceding symbol and the current symbol and clockwise rotation of less than 360 degrees between the current symbol and the succeeding symbol.

With reference now to FIG. 3, a third constellation is depicted where like numerals depict like items. This Figure illustrates the situation where the reverse phase shift is counterclockwise and is greater than 360 degrees while the forward phase shift is counterclockwise but less than 360 degrees. Typically, the maximum possible phase shift, either reverse or forward, is known for the type of waveform for which the inventive system and/or method is designed.

Figure 4:
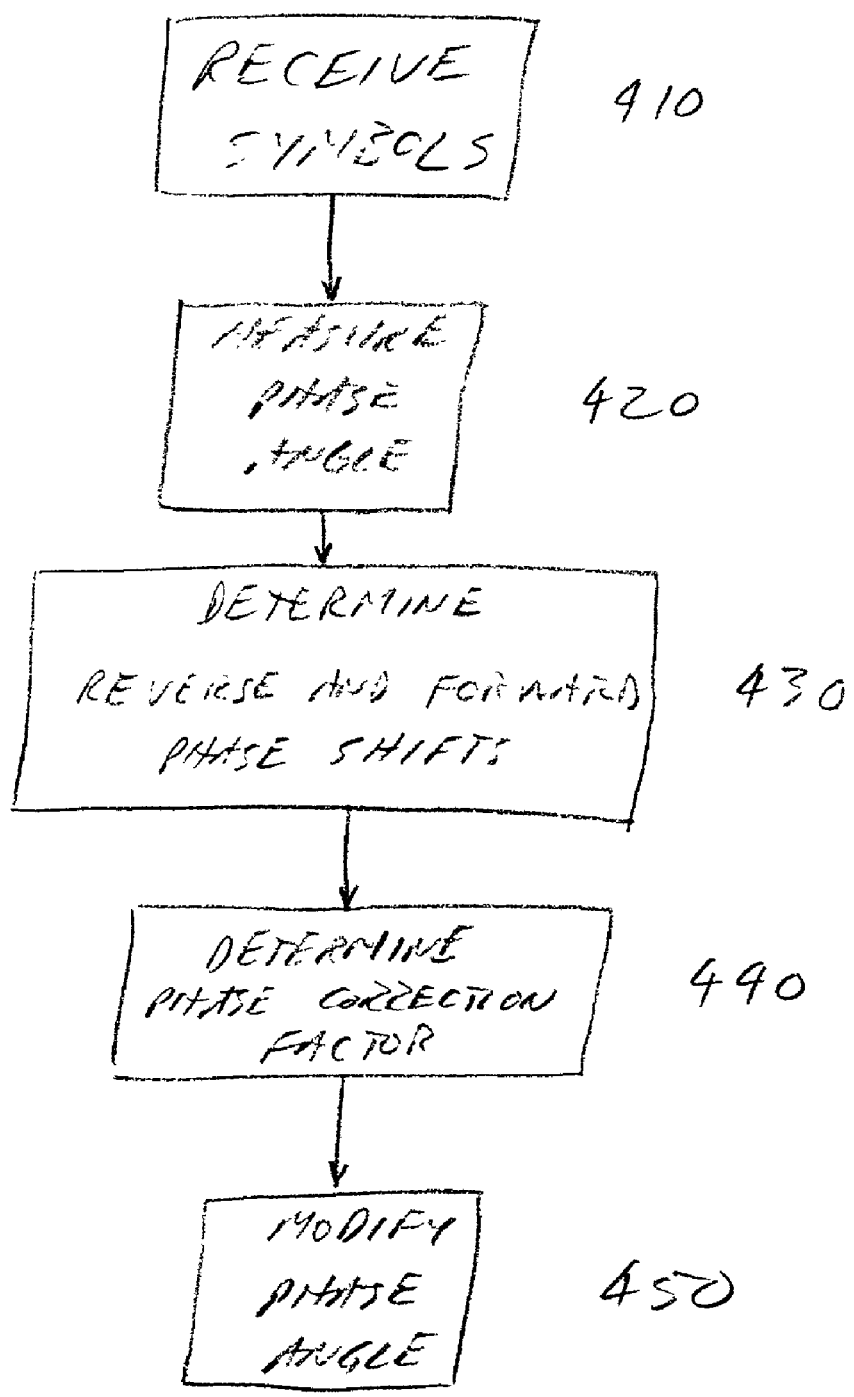
FIG. 4 is a high-level flow diagram illustrating the steps for modifying the phase angle of a received symbol according to the present invention.
Figure 5:
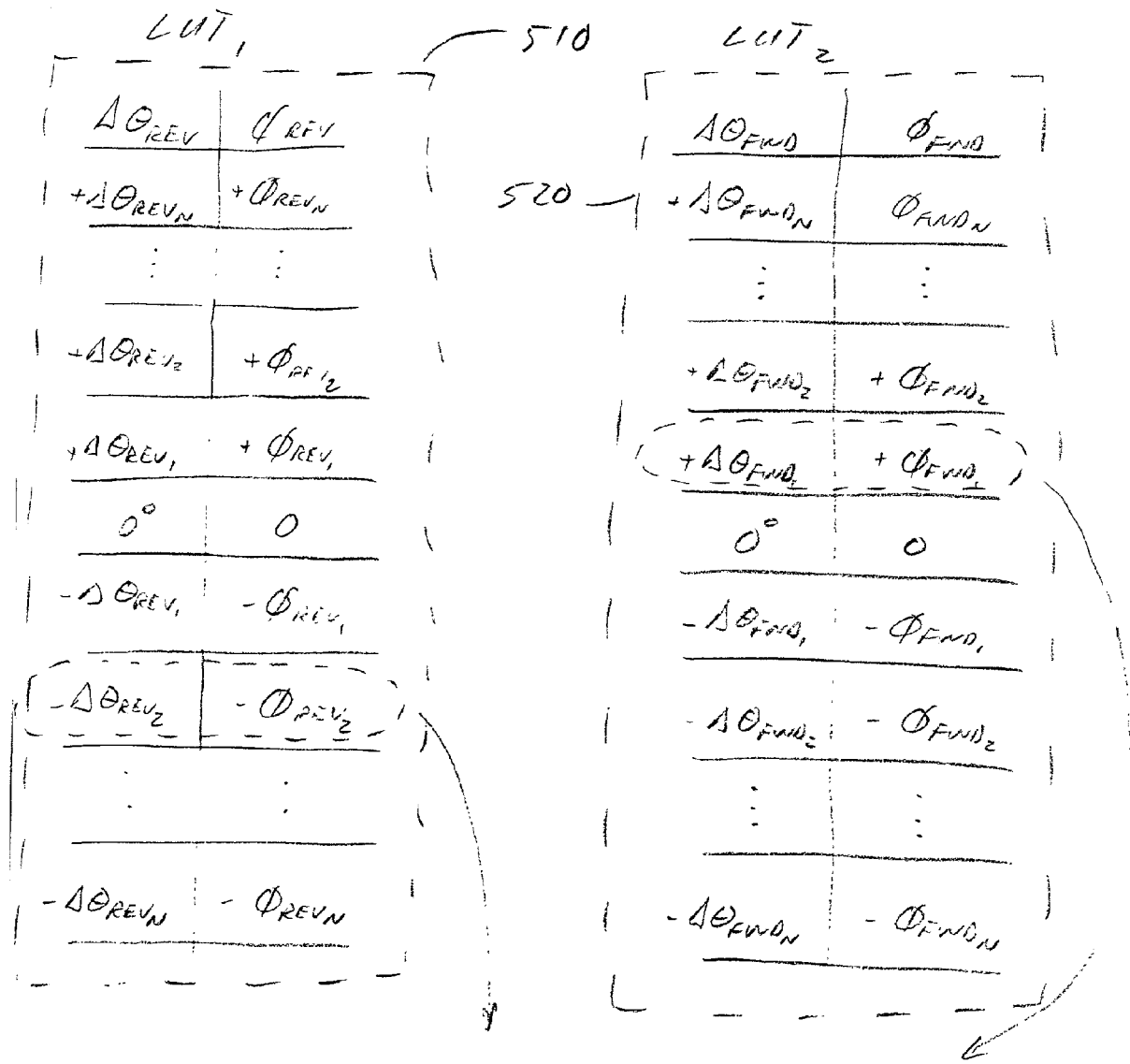
FIG. 5 is a notional view of one embodiment of the present invention showing two lookup tables for determining a reverse and a forward phase correction factor and modifying the phase angle of a received symbol.

A sequence of steps for one embodiment of the present invention is illustrated in the high-level block diagram FIG. 4. A predetermined number of symbols from a waveform, including preceding, current, and succeeding symbols, are received in step 410. The phase angle of the received symbols are measured in step 420. The reverse phase shift ($\Delta\theta_{rev}$) and the forward phase shift ($\Delta\theta_{fwd}$) are determined in step 430. A phase correction factor is determined in step 440 from the reverse and forward phase shifts determined in step 430. The phase correction factor is then used to modify the phase angle of the current symbol. In one embodiment of the present invention, the reverse and forward phase angles may be determined from two lookup tables, the lookup table 510 to determine a reverse phase correction factor ($\phi_{rev}$) from the reverse phase shift 550 and the lookup table 520 to determine a forward phase correction factor ($\phi_{fwd}$) from the forward phase shift 560, as shown in FIG. 5. The reverse and forward phase corrections are used to modify the angle of the received current symbol $\theta_{i_{rcvd}}$. Depending on the type of correction factor entered in the lookup tables 510 and 520, the correction factors may be, for example, added to $\theta_{i_{rcvd}}$ as in the equation 530 or multiplied by $\theta_{i_{rcvd}}$ as in the equation 540. As illustrated in FIG. 5, a reverse phase shift of $-\Delta\theta_{rev_2}$ results in a reverse phase correction factor of $-\phi_{rev_2}$ while a forward phase shift of $+\Delta\theta_{fwd_2}$ results in a forward phase correction factor of $+\phi_{fwd_2}$. The reverse and forward phase correction factors may be predetermined. One approach is to transmit known data through a simulated or actual satellite channel and measure the difference between the expected phase angle of a current symbol and the actual received phase angle of the current symbol. This procedure may be repeated for various reverse and forward phase shifts. Averaging the values of phase error measurements for a number of like phase shifts typically will improve the accuracy of the phase error by minimizing the effects of noise on the error estimates.

Another embodiment of the present invention calculates the angular distortion due to the reverse and forward phase shifts as shown in FIG. 6. A forward and reverse error ratio, $\delta_{fwd}$ and $\delta_{rev}$ rev respectively, are calculated in equations 610 from the difference between the expected angular position of the current symbol and the actual received angular position of the current symbol and the difference between the actual angular position of the current symbol and the angular position of the succeeding and preceding symbols, respectively. The error ratio then may be averaged over N samples to thereby calculate in equations 620 an average forward and reverse error ratio, $\alpha_{fwd}$ and $\alpha_{rev}$, respectively. A forward and reverse phase correction factor, $\phi_{fwd}$ and $\phi_{fwd}$, respectively, are calculated in equations 630 by multiplying the forward/reverse average error ratio with the forward/reverse phase shift, respectively. The forward and reverse phase correction factors are used to modify the actual received angular position of the current sample. One method is shown as a complex multiplication in equation 640.

Figure 7:
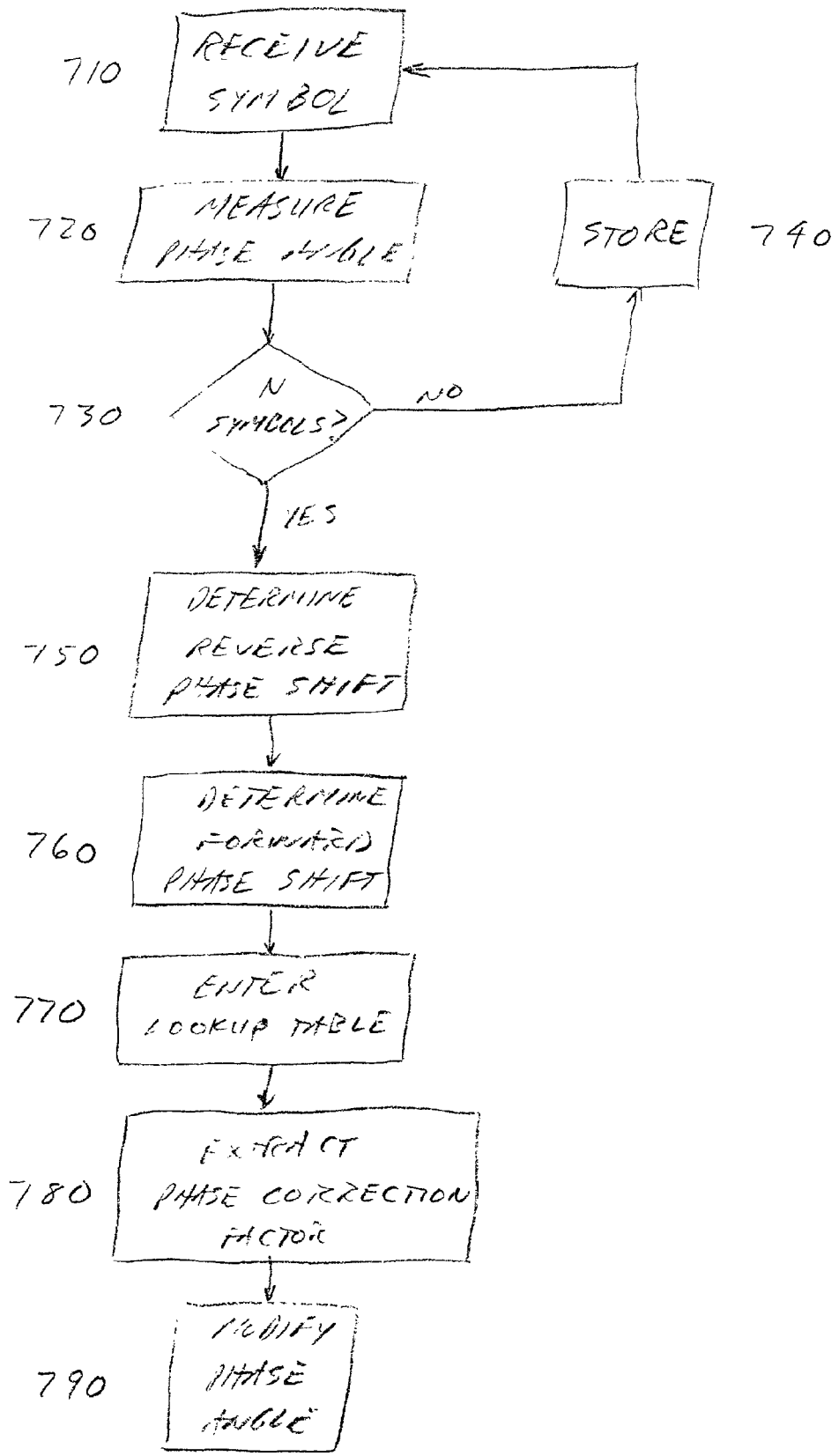
FIG. 7 is a more detailed flow diagram illustrating the steps for modify the phase angle of a received symbol according to the present invention.

With reference now to FIG. 7, a more detailed sequence of steps is illustrated in the block diagram. A symbol from a waveform is received in step 710. The angular position of the symbol is measured in step 720. Decision step 730 checks to see if N symbols have been received. If less than N symbols have been received and the angular positions of the symbols determined, the angular position of the received symbol is stored in step 740. The loop 710–740 is repeated until N symbols have been received and the angular positions determined. One embodiment of the present invention contemplates three symbols being received so that N=3, although other values of N are also contemplated. Typically, the number of preceding symbols and the number of succeeding symbols will be the same, although the inventive system and method may use M preceding symbols and N succeeding symbols where M≠N. Referring back to FIG. 7, after N symbols have been received and the angular positions determined, the reverse phase shift is determined in step 750 and the forward phase shift is determined in step 760. The values of the reverse and forward phase shifts are then used to enter a 2-D lookup table in step 770. A single phase correction factor is extracted from the lookup table in step 780. The phase correction factor from step 780 is used to modify the angular position of the current symbol in step 790 to thereby compensate for the angular distortion of the received current symbol. For example, the phase correction factor may be multiplied by the angular position of the received current symbol. In another example, the phase correction factor may be added to the angular position of the received current symbol to compensate for angular distortion and/or intersymbol interference.

FIG. 8 illustrates the 2-D lookup table 800 indexed by reverse and forward phase shifts. The 2-D lookup table 800 may be used for the lookup table in step 770 in FIG. 7. As is shown, the lookup table 800 may be populated with phase correction factors $\phi_{N,M}$ that may be determined beforehand for each given combination of reverse and forward phase shifts. For example, a reverse phase shift of $-\Delta\theta_{rev_1}$ and a forward phase shift of $+\Delta\theta_{fwd_N}$ will require a phase correction factor of $\phi_{N,-1}$ in order to compensate for the distortion due to this particular combination of reverse and forward phase shifts. As another example, a reverse phase shift of $+\Delta\theta_{rev_M}$ and a forward phase shift of $+\Delta\theta_{fwd_1}$ will require a phase correction factor of $\phi_{1,M}$ in order to compensate for the distortion due to this particular combination of reverse and forward phase shifts. Typically, the largest possible phase shifts for a particular waveform and modulation are known and designed for in the implementation of the 2-D lookup table in the present invention.

One embodiment of the present invention contemplates dynamically updating the values of the phase correction factors in the lookup table 800 with values determined during the operation of an equalizer system using the inventive method. Typically, N=M in the lookup table 800 and the maximum values of N and M are known based on the type of waveform and the type of modulation being used with the waveform, as is known in the art. The size of the lookup table may vary from one implementation to the next and a limiting factor on the size of the lookup table is the amount of memory to be dedicated to the lookup table. The number of rows and columns of the lookup table 800 may be determined based on the maximum values of N and M, the available memory for the lookup table, and the design amount of quantization for the table, e.g., there may be a phase correction factor value for every degree of phase shift, every half-degree, every four degrees, etc. The foregoing values are illustrative only and are not meant to limit the invention in any way.

Figure 9:
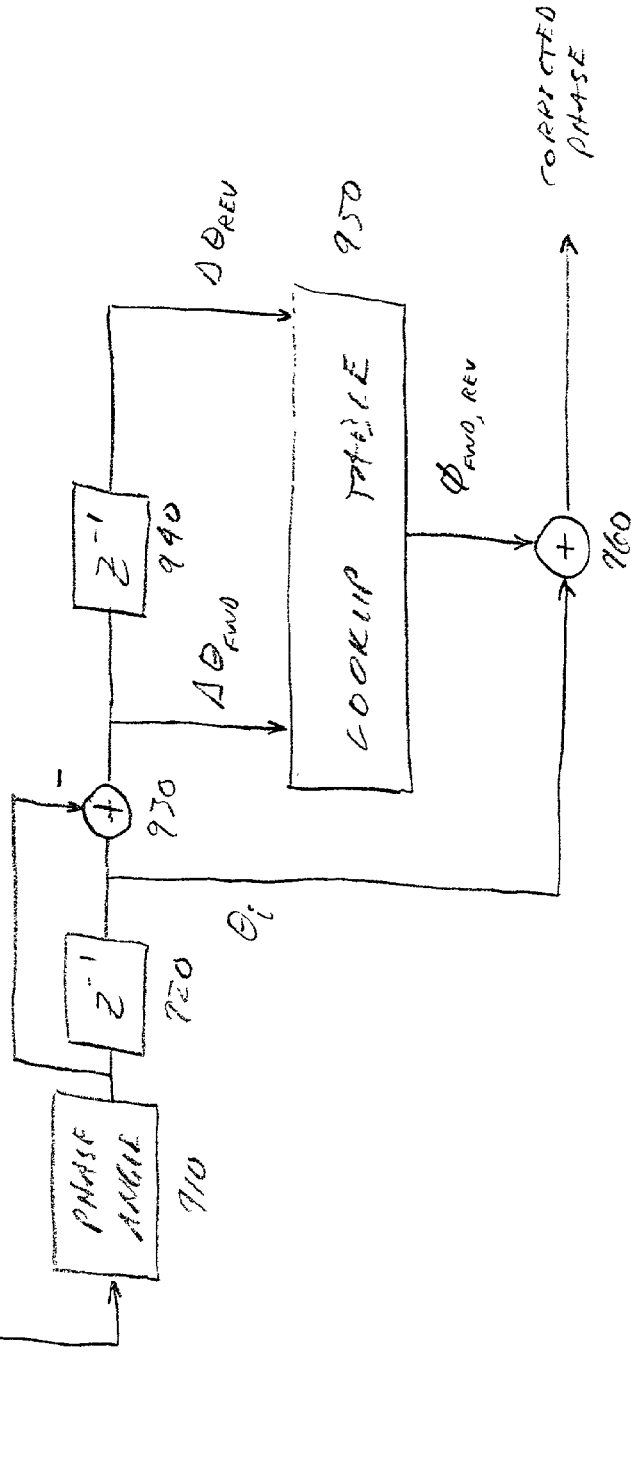
FIG. 9 is a block diagram showing one embodiment of the present invention.
Figure 1:
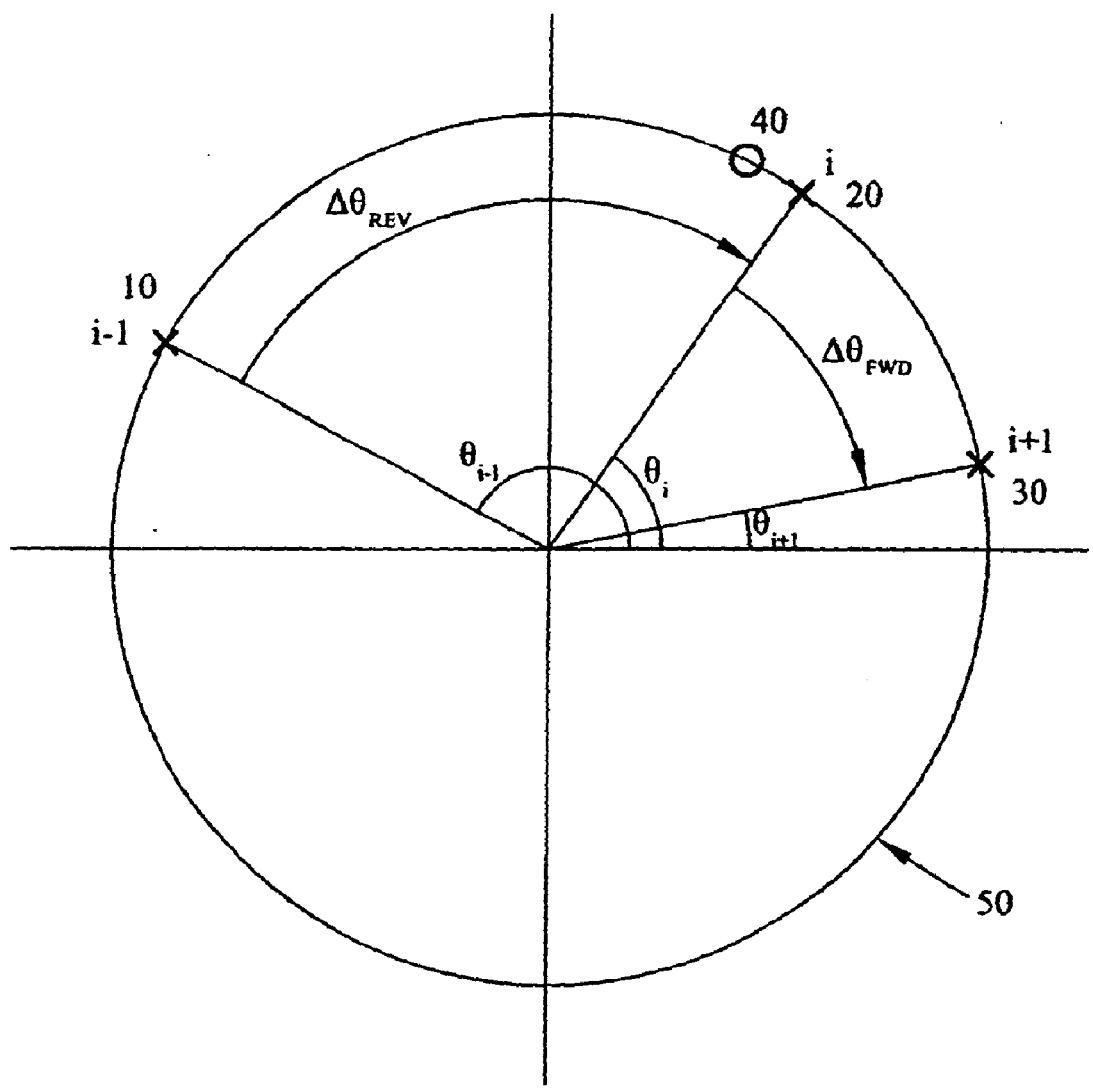
Figure 2:
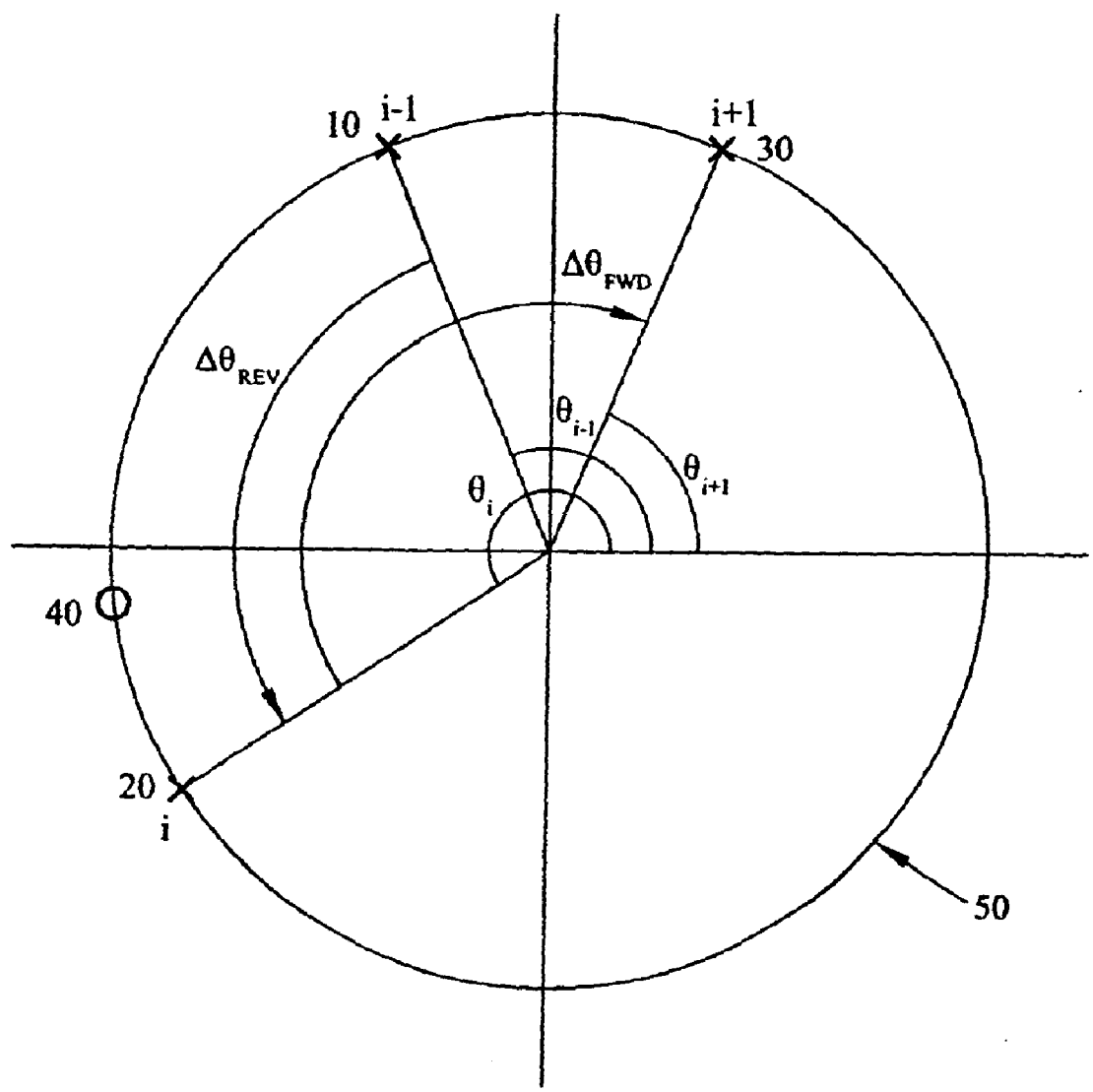
Figure 3:
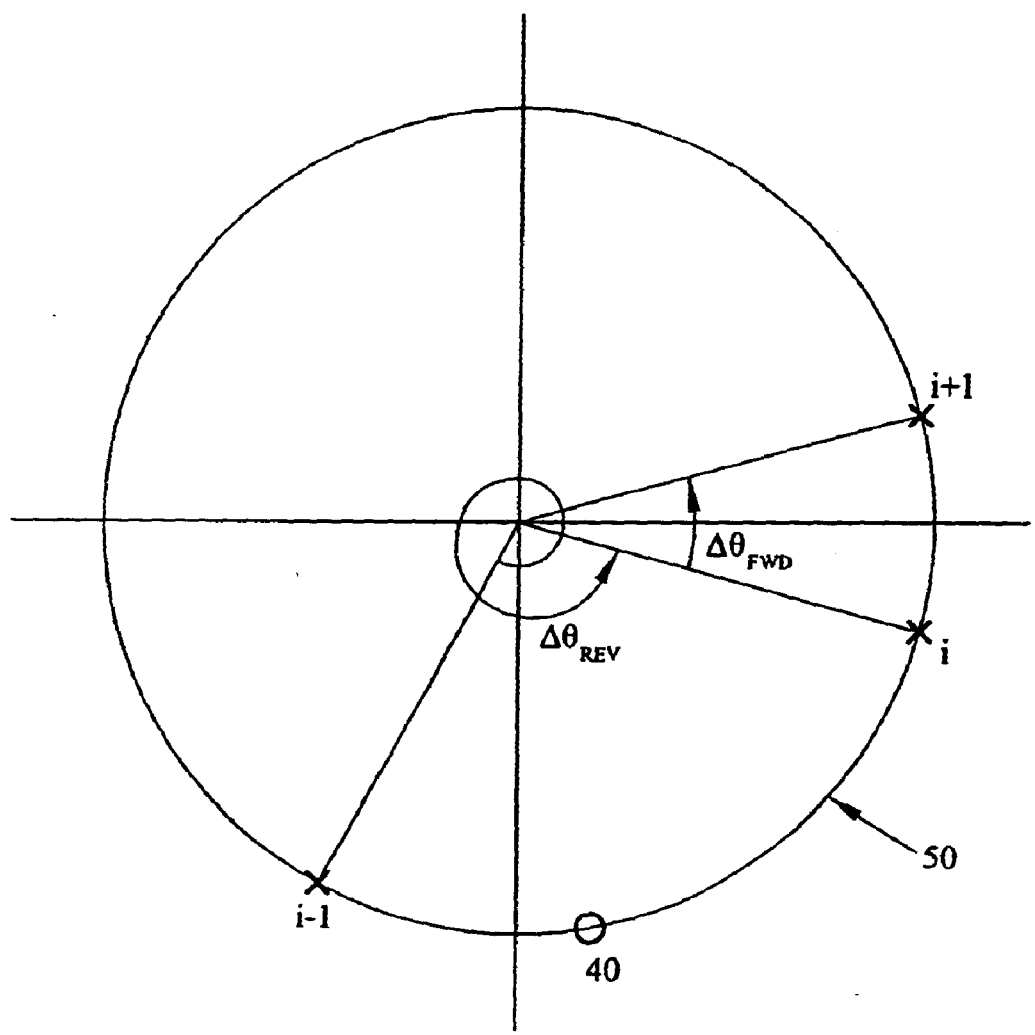
Figure 4:
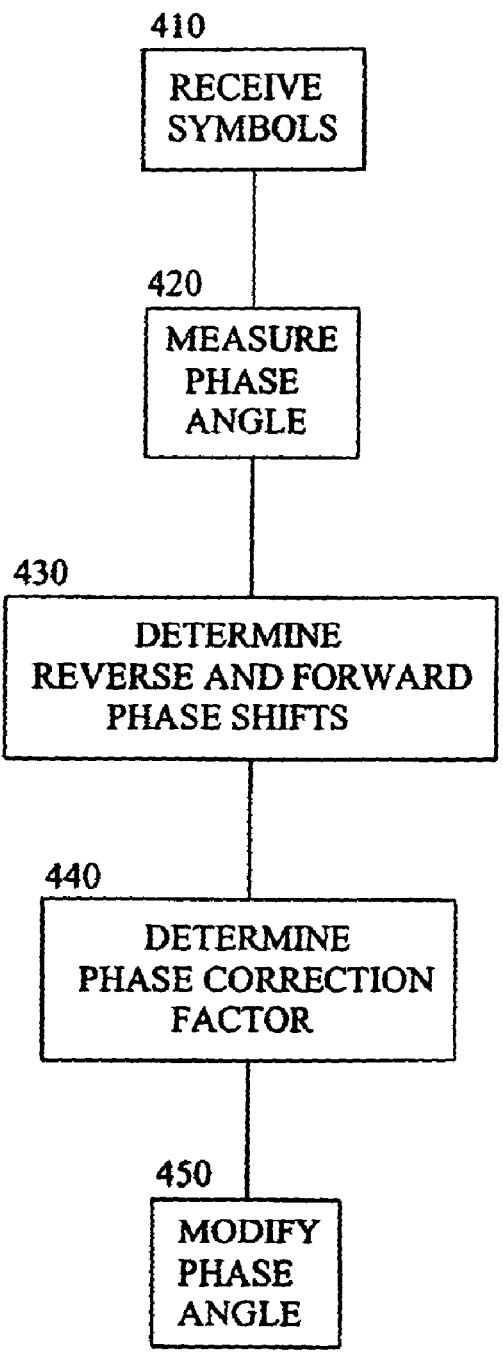
Figure 5:
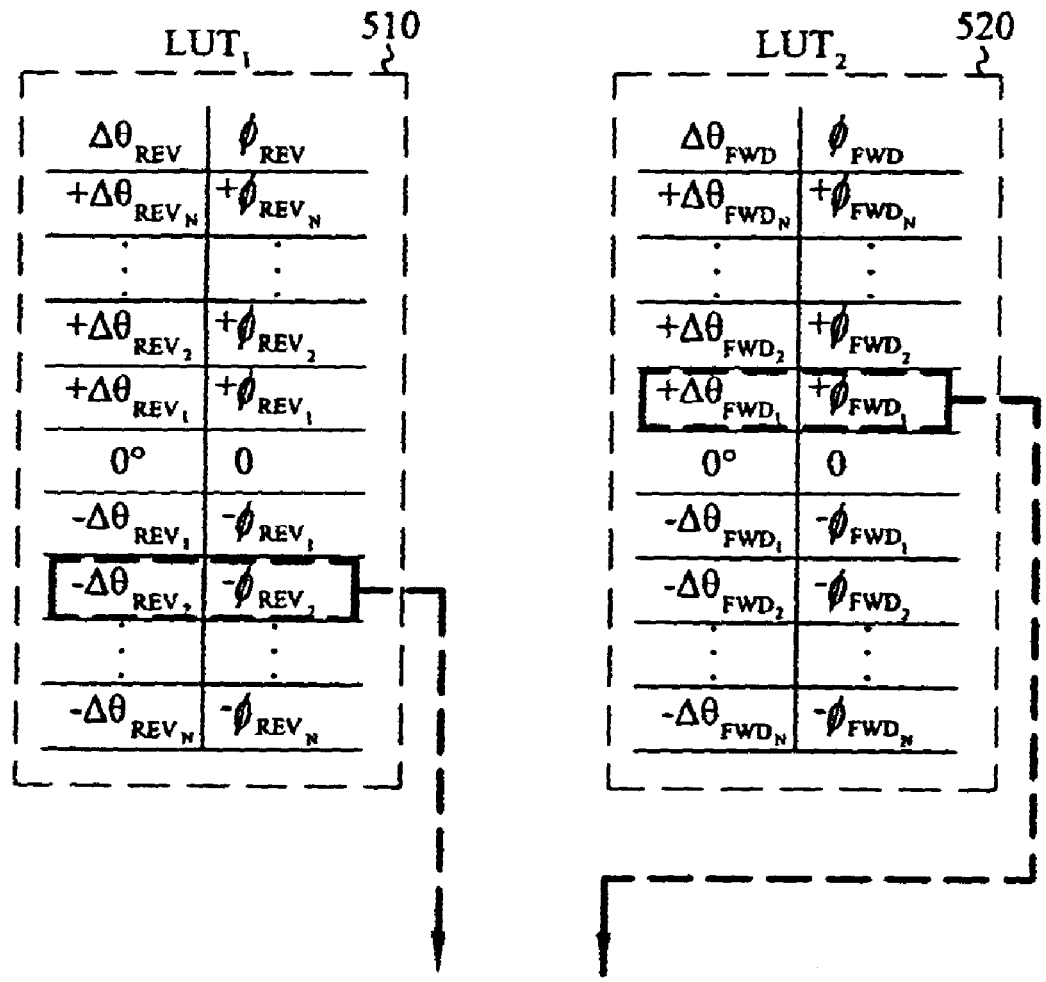
Figure 7:
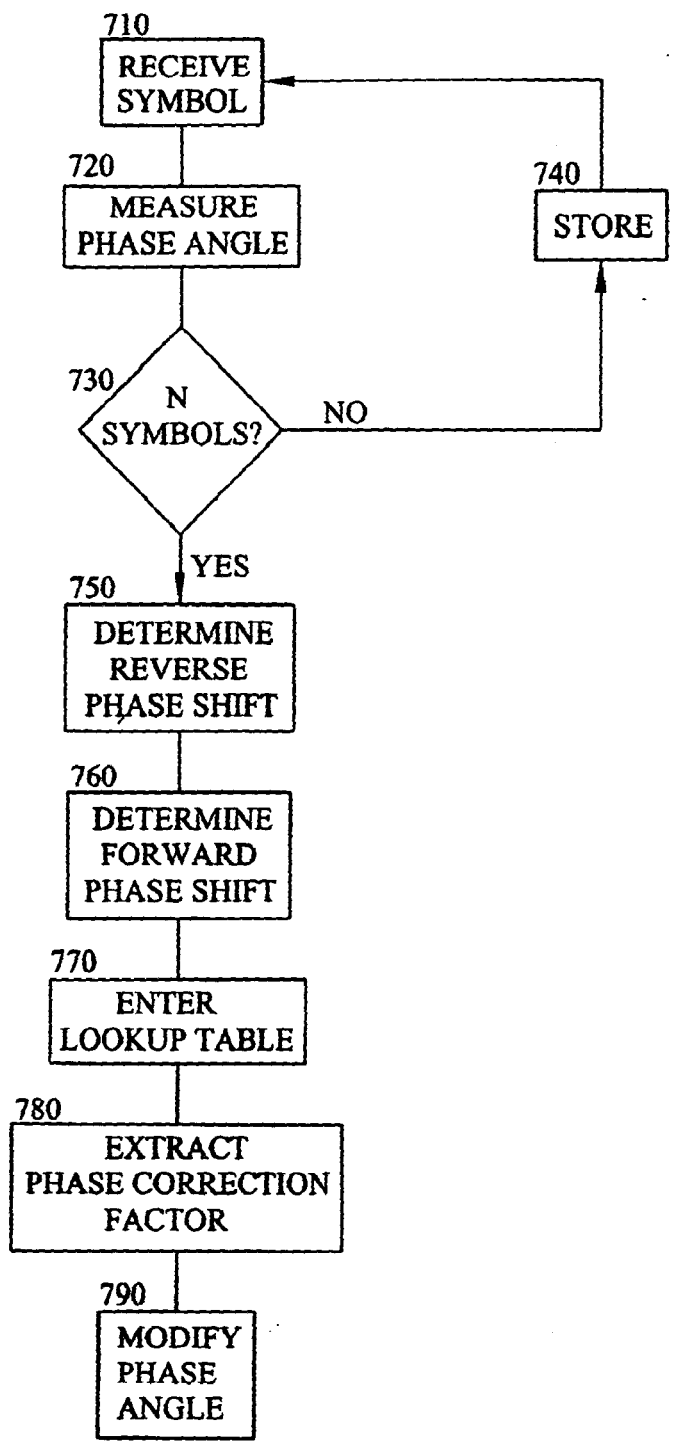
Figure 9:
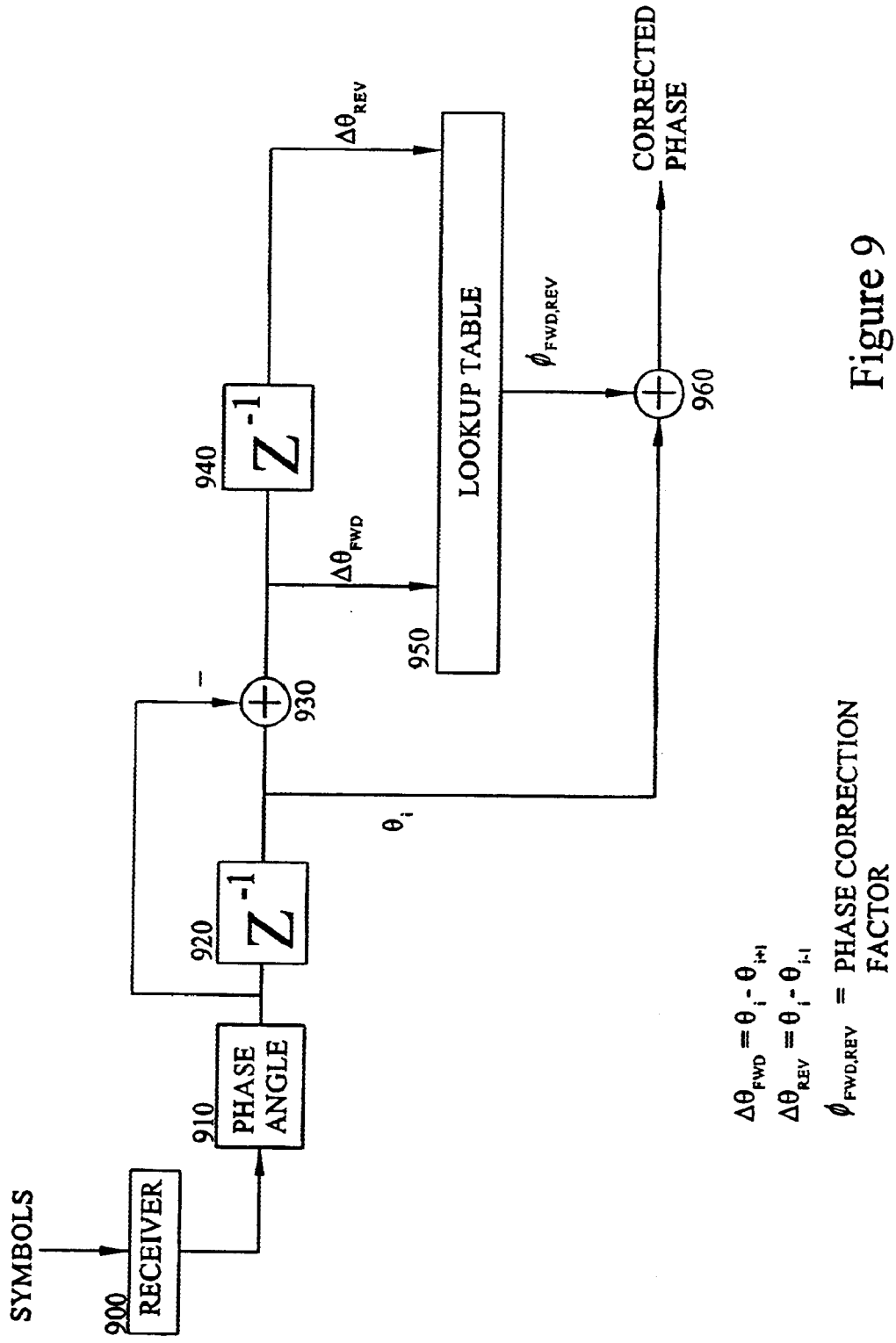

With reference now to FIG. 9, a block diagram of the inventive system is shown. Symbols are received by the receiver 900 and are sent to the phase angle measuring device 910. The phase angle measuring device may, for example, measure the arctangent of a received symbol to thereby determine the angular position, or phase angle, of the received symbol. The delay 920 delays the phase angle information one cycle so that the phase angle of a second received symbol can be algebraically added to the phase angle of a first received symbol in the adder 930. The output of the delay is also used as the received angular position of the current symbol, $\theta_i$. The output of the adder 930 is the forward phase shift $\Delta\theta_{fwd}$. The forward phase shift is delayed another cycle in delay 940 thereby resulting in the reverse phase shift $\Delta\theta_{rev}$ for the current symbol whose angular position information is then being output by the delay 920. The forward and reverse phase shift information is used to enter the 2-D lookup table 950 to thereby extract the phase correction factor $\phi_{fwd,rev}$. The 2-D lookup table 800 in FIG. 8 may be used for the lookup table 950 in FIG. 9. With reference back to FIG. 9, the phase correction factor is used to modify the angular position information of the current symbol in 960, thereby resulting in corrected phase information for the current symbol and compensating for distortion and/or intersymbol interference in the received waveform.

While preferred embodiments of the present invention have been described, it is to be understood that the embodiments described are illustrative only and that the scope of the invention is to be defined solely by the appended claims when accorded a fill range of equivalence, many variations and modifications naturally occurring to those of skill in the art from a perusal hereof.

What is claimed is:

1. A method of compensating for distortion of a received waveform containing digital symbols at one of a predetermined number of phase angles comprising the steps of:
   (a) receiving at least three successive symbols;
   (b) measuring the phase angle of a one of said received symbols;
   (c) determining for said one received symbol a reverse phase shift between said one received symbol and an immediately preceding symbol and a forward phase shift between said one received symbol and an immediately succeeding symbol;
   (d) modifying the phase angle of said one received symbol as a function of both the reverse and forward phase shifts to thereby compensate for phase distortion of the received waveform.

2. The method of claim 1 wherein the received waveform is a continuous phase modulation waveform.

3. The method of claim 2 wherein the received waveform is 4-ary modulated.

4. The method of claim 2 wherein the received waveform is 8-ary modulated.

5. The method of claim 2 wherein the received waveform is 16-ary modulated.

6. The method of claim 2 wherein the received waveform is in a 25 KHz channel.

7. The method of claim 6 wherein the received waveform is in a satellite communication channel.

8. The method of claim 1 wherein the step of modifying the phase angle of said one received symbol comprises the steps of:
   (i) providing a first lookup table, indexed by reverse phase shift, of reverse phase correction factors for all possible phase angles of the immediately preceding symbol and thus all possible reverse phase shifts;
   (ii) providing a second lookup table, indexed by forward phase shift, of forward phase correction factors for all possible phase angles of the immediately succeeding symbol and thus all possible forward phase shifts;
   (iii) extracting from said first lookup table a reverse phase correction factor for said reverse phase shift determined in step (c);
   (iv) extracting from said second lookup table a forward phase correction factor for said forward phase shift determined in step (c);
   (v) multiplying the phase angle of said one received symbol by the reverse phase correction factor extracted from said first lookup table and by the forward phase correction factor extracted from said second lookup table.

9. The method of claim 8 wherein the step of providing said first lookup table comprises the steps of:
   (1) determining the difference between the expected phase angle of a received symbol and the phase angle of the immediately preceding symbol to thereby determine an expected reverse phase shift;
   (2) determining the difference between the actual phase angle of the received symbol and the phase angle of the immediately preceding symbol to thereby determine an actual reverse phase shift;
   (3) dividing the expected reverse phase shift by the actual reverse phase shift to thereby determine a reverse error ratio;
   (4) multiplying the reverse error ratio by the actual reverse phase shift to thereby determine a reverse phase correction factor;
   (5) entering the reverse phase correction factor in said first lookup table indexed by said actual reverse phase shift;
   (6) repeating steps (1) through (5) for each possible reverse phase shift.

10. The method of claim 9 wherein steps (5) and (6) are replaced with the following steps:
   (5) iterating steps (1) through (4) at least one time and averaging the values for the reverse phase correction factor for each iteration to thereby determine an average reverse phase correction factor;
   (6) entering the average reverse phase correction factor in said first lookup table indexed by said actual reverse phase shift;
   (7) repeating steps (1) through (6) for each possible reverse phase shift.

11. The method of claim 8 wherein the step of providing said second lookup table comprises the steps of:
   (1) determining the difference between the expected phase angle of a received symbol and the phase angle of the immediately succeeding symbol to thereby determine an expected forward phase shift;
   (2) determining the difference between the actual phase angle of the received symbol and the phase angle of the immediately succeeding symbol to thereby determine an actual forward phase shift;
   (3) dividing the expected forward phase shift by the actual forward phase shift to thereby determine a forward error ratio;
   (4) multiplying the forward error ratio by the actual forward phase shift to thereby determine a forward phase correction factor;
   (5) entering the forward phase correction factor in said second lookup table indexed by said actual forward phase shift;
   (6) repeating steps (1) through (5) for each possible forward phase shift.

12. The method of claim 11 wherein steps (5) and (6) are replaced with the following steps:
   (5) iterating steps (1) through (4) at least one time and averaging the values for the forward phase correction factor for each iteration to thereby determine an average forward phase correction factor;
   (6) entering the average forward phase correction factor in said first lookup table indexed by said actual forward phase shift;

(7) repeating steps (1) through (6) for each possible forward phase shift.

13. The method of claim 1 wherein the step of modifying the phase angle of said one received symbol comprises the steps of:
   (i) determining a phase correction factor as a function of the reverse and forward phase shifts;
   (ii) modifying the phase angle of said one received symbol by the phase correction factor.

14. The method of claim 13 wherein the phase correction factor is a linear function of the combination of the reverse and forward phase shifts.

15. The method of claim 13 wherein the phase correction factor is added to the phase angle of said one received symbol.

16. The method of claim 13 wherein the phase correction factor is determined from a lookup table.

17. The method of claim 13 wherein the phase correction factor is proportional to the magnitude of the reverse and forward phase shifts.

18. The method of claim 1 wherein steps (c) and (d) are replaced with the following steps:
   (c) determining a phase correction factor as a function of the reverse phase shift and the forward phase shift;
   (d) multiplying the phase angle of said one received symbol by the phase correction factor to thereby compensate for distortion of the received waveform.

19. The method of claim 18 wherein the phase correction factor is chosen to minimize the mean square difference between the expected phase angle of said one received symbol and the actual phase angle of said one received symbol.

20. The method of claim 19 wherein said difference is a weighted difference.

21. The method of claim 20 wherein the weighted difference is a function of the amplitude of said one received symbol.

22. The method of claim 20 wherein the weighted difference is a function of the square of the amplitude of said one received symbol.

23. The method of claim 18 wherein the phase correction factor is chosen to minimize the absolute value of the difference between the expected phase angle of said one received symbol and the actual phase angle of said one received symbol.

24. The method of claim 23 wherein said difference is a weighted difference.

25. The method of claim 24 wherein the weighted difference is a function of the amplitude of said one received symbol.

26. The method of claim 24 wherein the weighted difference is a function of the square of the amplitude of said one received symbol.

27. A method of equalizing a received waveform containing digital symbols at one of a predetermined number of phase angles comprising the steps of:
   (a) receiving at least three successive symbols;
   (b) measuring the phase angle of the received symbols;
   (c) determining for one of the received symbols a reverse phase shift between said one received symbol and an immediately preceding symbol;
   (d) determining for said one received symbol a forward phase shift between said one received symbol and an immediately succeeding symbol;
   (e) providing a two-dimensional lookup table of phase correction factors for all possible combinations of forward and reverse phase angles and thus all possible combinations of reverse and forward phase shifts, indexed by reverse phase shift and forward phase shift;
   (f) extracting from said lookup table a phase correction factor for the reverse phase shift determined in step (c) and the forward phase shift determined in step (d);
   (g) modifying the phase angle of said one received symbol by the phase correction factor from step (f) to thereby equalize the received waveform.

28. The method of claim 27 wherein the received waveform is a continuous phase modulation waveform.

29. The method of claim 27 wherein the phase correction factors populating the lookup table in step (e) are chosen to minimize the mean square difference between the expected phase angle of said one received symbol and the actual phase angle of said one received symbol.

30. The method of claim 29 wherein said difference is a weighted difference.

31. The method of claim 30 wherein the weighted difference is a function of the amplitude of said one received symbol.

32. The method of claim 20 wherein the weighted difference is a function of the square of the amplitude of said one received symbol.

33. The method of claim 27 wherein the phase correction factors populating the lookup table in step (e) are chosen to minimize the absolute value of the difference between the expected phase angle of said one received symbol and the actual phase angle of said one received symbol.

34. The method of claim 33 wherein said difference is a weighted difference.

35. The method of claim 34 wherein the weighted difference is a function of the amplitude of said one received symbol.

36. The method of claim 34 wherein the weighted difference is a function of the square of the amplitude of said one received symbol.

37. A method of reducing intersymbol interference in the form of phase error of a received waveform containing digital symbols at one of a predetermined number of phase angles comprising the steps of:
   (a) receiving successive symbols;
   (b) measuring the phase angle of a one of said received symbols;
   (c) determining for each of a first predetermined number of received symbols preceding said one received symbol a reverse phase shift;
   (d) determining for each of a second predetermined number of received symbols succeeding said one received symbol a forward phase shift;
   (e) modifying the phase angle of said one received symbol as a function of the first predetermined number of reverse phase shifts and the second predetermined number of forward phase shifts to thereby reduce the intersymbol interference of the received waveform.

38. The method of claim 37 wherein the first predetermined number of received symbols equals the second predetermined number of received symbols.

39. The method of claim 37 wherein the received waveform is a continuous phase modulation waveform.

40. A non-linear equalizer for compensating for distortion of a received waveform containing digital symbols at one of a predetermined number of phase angles comprising:
   a receiver for receiving at least three successive symbols;
   measuring means for determining the phase angle of a one of said received symbols;
   means for determining for said one received symbol a reverse phase shift between said one received symbol and an immediately preceding symbol and a forward phase shift between said one received symbol and an immediately succeeding symbol;

means for modifying the phase angle of said one received symbol as a function of both the reverse and forward phase shifts to thereby compensate for phase distortion of the received waveform.

41. The non-linear equalizer of claim 40 wherein the received waveform is a continuous phase modulation waveform.

42. The non-linear equalizer of claim 40 wherein the means for modifying the phase angle of said one received symbol includes extracting a phase correction factor from a lookup table.

43. The non-linear equalizer of claim 42 wherein the lookup table is a two-dimensional lookup table indexed by reverse phase shift and forward phase shift.

44. The non-linear equalizer of claim 43 wherein the lookup table is populated with phase correction factors determined from previously-received symbols.

45. The non-linear equalizer of claim 44 wherein the phase correction factors in said lookup table are dynamically updated with information derived from received symbols.

46. An angular distortion compensator for modifying the phase angle of a digital symbol in a received waveform containing digital symbols at one of a predetermined number of phase angles comprising:

a receiver for receiving at least three successive symbols;

means for measuring the phase angle of said received symbols;

means for determining a phase angle correction factor as a function of the difference in phase angles between one of said received symbols and an immediately preceding symbol and said one of said received symbols and an immediately succeeding symbol;

modifying means for modifying the phase angle of said one of said received symbols by the phase angle correction factor to thereby modify the phase angle.

47. The compensator of claim 46 wherein the received waveform is a continuous phase modulation waveform.

48. The compensator of claim 46 wherein the modifying means adds the phase angle correction factor to the phase angle of said one of said received symbols.

49. The compensator of claim 46 wherein the phase angle correction factor is chosen to minimize the mean square difference between the expected phase angle of said one of said received symbols and the actual phase angle of said one of said received symbols.

50. The compensator of claim 49 wherein said difference is a weighted difference.

51. The compensator of claim 50 wherein the weighted difference is a function of the amplitude of said one of said received symbols.

52. The compensator of claim 50 wherein the weighted difference is a function of the square of the amplitude of said one of said received symbols.

53. The compensator of claim 46 wherein the phase correction factor is chosen to minimize the absolute value of the difference between the expected phase angle of said one of said received symbols and the actual phase angle of said one of said received symbols.

54. The compensator of claim 53 wherein said difference is a weighted difference.

55. The compensator of claim 54 wherein the weighted difference is a function of the amplitude of said one of said received symbols.

56. The compensator of claim 54 wherein the weighted difference is a function of the square of the amplitude of said one of said received symbols.

* * * * *

UNITED STATES PATENT AND TRADEMARK OFFICE
CERTIFICATE OF CORRECTION

| | | |
|---|---|---|
| PATENT NO. | : 7,031,382 B2 | Page 1 of 10 |
| APPLICATION NO. | : 09/983110 | |
| DATED | : April 18, 2006 | |
| INVENTOR(S) | : Clifford Hessel and James A. Norris | |

It is certified that error appears in the above-identified patent and that said Letters Patent is hereby corrected as shown below:

In the drawings:

Figures 1 through 9 issued as informal drawings. Formal drawings labeled as Figures 1 through 9 are shown on the attached pages Signed and Sealed this Tenth Day of October, 2006

JON W. DUDAS
*Director of the United States Patent and Trademark Office*

$$\theta_{i_{MOD}} = \theta_{i_{RCVD}} + (-\phi_{REV_2}) + (-\phi_{FWD_1}) \quad 530$$

$$\theta_{i_{MOD}} = \theta_{i_{RCVD}} (-\phi_{REV_2})(-\phi_{FWD_1}) \quad 540$$

$$\Delta\theta_{REV} = \theta_i - \theta_{i-1} \quad 550$$

$$\Delta\theta_{FWD} = \theta_i - \theta_{i+1} \quad 560$$

$$\delta_{fwd} = \frac{(\theta_{exp} - \theta_i)}{(\theta_i - \theta_{i+1})} \qquad \delta_{rev} = \frac{(\theta_{exp} - \theta_i)}{(\theta_i - \theta_{i-1})} \qquad 610$$

$$\alpha_{fwd} = \frac{1}{N}\sum_N \delta_{fwd} \qquad \alpha_{rev} = \frac{1}{N}\sum_N \delta_{rev} \qquad 620$$

$$\phi_{fwd} = (\theta_i - \theta_{i+1}) \cdot \alpha_{fwd} \qquad \phi_{rev} = (\theta_i - \theta_{i-1}) \cdot \alpha_{rev} \qquad 630$$

$$e^{j\theta_i} e^{j\phi_{fwd}} e^{j\phi_{rev}} \qquad 640$$

where:
- $\theta_i$ = actual angular position of the current symbol
- $\theta_{exp}$ = expected angular position of the current symbol
- $\theta_{i-1}$ = angular position of the preceding symbol
- $\theta_{i+1}$ = angular position of the succeeding symbol
- $\phi_{rev}$ = reverse phase correction factor
- $\phi_{fwd}$ = forward phase correction factor

Figure 6

2-D LUT

| $+\Delta\theta_{REV_M}$ | $\phi_{-N,M}$ | ... | $\phi_{-1,M}$ | $\phi_{0,M}$ | $\phi_{1,M}$ | ... | $\phi_{N,M}$ |
|---|---|---|---|---|---|---|---|
| ⋮ | ⋮ | ⋱ | ⋮ | ⋮ | ⋮ | ⋰ | ⋮ |
| $+\Delta\theta_{REV_1}$ | $\phi_{-N,1}$ | ... | $\phi_{-1,1}$ | $\phi_{0,1}$ | $\phi_{1,1}$ | ... | $\phi_{N,1}$ |
| 0 | $\phi_{-N,0}$ | ... | $\phi_{-1,0}$ | 0 | $\phi_{1,0}$ | ... | $\phi_{N,0}$ |
| $-\Delta\theta_{REV_1}$ | $\phi_{-N,-1}$ | ... | $\phi_{-1,-1}$ | $\phi_{0,-1}$ | $\phi_{1,-1}$ | ... | $\phi_{N,-1}$ |
| ⋮ | ⋮ | ⋰ | ⋮ | ⋮ | ⋮ | ⋱ | ⋮ |
| $-\Delta\theta_{REV_M}$ | $\phi_{-N,-M}$ | ... | $\phi_{-1,-M}$ | $\phi_{0,-M}$ | $\phi_{1,-M}$ | ... | $\phi_{N,-M}$ |
|  | $-\Delta\theta_{FWD_N}$ | ... | $-\Delta\theta_{FWD_1}$ | 0 | $+\Delta\theta_{FWD_1}$ | ... | $+\Delta\theta_{FWD_N}$ |

↖ 800

Figure 8